(12) United States Patent
Gupta et al.

(10) Patent No.: US 11,816,550 B1
(45) Date of Patent: Nov. 14, 2023

(54) CONFIDENCE SCORE GENERATION FOR BOOSTING-BASED TREE MACHINE LEARNING MODELS

(71) Applicant: Amazon Technologies, Inc., Seattle, WA (US)

(72) Inventors: Deepak Gupta, Delhi (IN); Anirban Majumder, Bangalore (IN); Prateek Sircar, Noida (IN); Rajeev Ramnarain Rastogi, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 491 days.

(21) Appl. No.: 16/933,215

(22) Filed: Jul. 20, 2020

(51) Int. Cl.
*G06N 20/20* (2019.01)
*G06N 5/04* (2023.01)
*G06N 5/01* (2023.01)

(52) U.S. Cl.
CPC ............. *G06N 20/20* (2019.01); *G06N 5/01* (2023.01); *G06N 5/04* (2013.01)

(58) Field of Classification Search
CPC .......... G06N 20/20; G06N 5/003; G06N 5/04; G06Q 20/108; G06Q 20/4016; G06Q 30/0224
See application file for complete search history.

(56) References Cited

U.S. PATENT DOCUMENTS

| | | | |
|---|---|---|---|
| 7,668,776 B1* | 2/2010 | Ahles | G06Q 20/4016 705/42 |
| 2018/0350006 A1* | 12/2018 | Agrawal | G06F 7/026 |
| 2020/0184017 A1* | 6/2020 | Batra | G06N 5/01 |

OTHER PUBLICATIONS

Varun Chandola, Anomaly Detection : A Survey, Sep. 2009, ACM Computing Surveys (Year: 2009).*

* cited by examiner

*Primary Examiner* — Kevin W Figueroa
(74) *Attorney, Agent, or Firm* — K&L Gates LLP (57) ABSTRACT

Devices and techniques are generally described for generating confidence scores for boosting-based tree machine learning models. In various examples, a first record comprising a plurality of input variables may be received. In another example, a boosting-based tree machine learning model may generate, for the first record, a base model score. In various examples, the base model score may be generated based on the plurality of input variables and the base model score may represent a likelihood that the first record is associated with a first class. In some examples, a score confidence machine learning model may generate a confidence score for the first record. The confidence score may indicate a confidence in the base model score. In various examples, the first record may be processed based at least in part on the confidence score.

17 Claims, 7 Drawing Sheets

CONFIDENCE SCORE GENERATION FOR BOOSTING-BASED TREE MACHINE LEARNING MODELS

BACKGROUND

Machine learning models are able to learn patterns in existing data in order to generate predictions for new, previously-unseen data. Machine learning algorithms build a mathematical model based on training data in order to make predictions on new data without being explicitly programmed to make such predictions. Machine learning is used in a wide variety of contexts, from computer vision to email filtering.

DETAILED DESCRIPTION

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Machine learning models may be used to solve various different problems. For example, for an e-commerce service, machine learning models may be used to identify problematic accounts and/or reject certain options for certain accounts. For example, if a particular account is associated with defaulting on payments when using a Payment on Delivery (PoD) option, the PoD option may be disabled for the account for a particular time period. In another example, if it is determined that an account has an unusual number of product returns due to product quality, that an account requests abusive concessions, etc., the account may be flagged and/or various remedial actions may be taken. Examples of remedial actions may be suppression of the PoD option, suppression of particular e-commerce accounts, suppression of particular sellers and/or item listings, automated account closure, routing of transactions to fraud detection teams, etc. In various examples, such remedial actions may be taken when the confidence score of a machine learning classifier has determined that such a remedial action is appropriate (e.g., a classifier has determined with greater than a threshold confidence score that an account should be terminated). Since these actions have a direct impact on user experiences, it is desirable to have a high confidence for the relevant predictions. For example, there may be a set of predictions for a first feature sub-space with a score range that has a very certain prediction estimate (high confidence prediction), whereas for a different feature subspace in the same score range the set of predictions may not have a very high confidence of the prediction. The uncertainty in the predictions may be driven by data noise (e.g., by extreme values of variables), by process noise in underlying features (e.g., time out of a specific service resulting into higher missing percentage for some variables), by a low density of points in a specific region, etc. Therefore, it may be useful to generate a score confidence mechanism to provide confidence for base machine learning model predictions for a given classification task.

For parametric models, such as logistic regression, artificial neural networks, etc., there are known methodologies to build confidence intervals associated with each prediction. However, for tree-based machine learning algorithms like XG-boost, gradient boosting, etc., there are limited methodologies are available to build confidence interval. However, for certain classification tasks with structured data and hand-tailored features, XG-Boost performs better than the parametric models. Accordingly, using a scalable mechanism to build reliable score confidence for boosting-based tree machine learning techniques may be advantageous. Accordingly, various techniques are described below for generating confidence scores for tree-based machine learning algorithms (e.g., boosting-based tree machine learning model scores).

The process of confidence intervals for base model predictions and/or standard deviation for base model prediction varies with the technique which is being used to make the prediction (e.g., for the base model). For parametric approaches, the model architecture and distributional assumptions are fixed. In these use cases, the standard deviation can be derived using the data points used for training along with the distributional assumptions of dependent variables and residuals.

For example, in linear regression where the underlying equation is $$Y = X\beta + \epsilon$$

With an assumption that $\epsilon$ is an independent and identically distributed (iid) random variable which follows $N(0, \sigma^2)$, Variance of the mean response can be calculated with the closed-form solution below:

$$V(\hat{Y}) = \sigma^2 X(X'X)^{-1}X'.$$

Standard deviation of predicted responses can be derived from the variance. In Bayesian models, under certain assumptions, posterior distribution of the response from a model can be evaluated after deriving the posterior distribution of the parameters in the model. For example, in Bayesian linear regression, if the following relation is assumed $$Y_i|x_i,\alpha,\beta,\sigma^2 \sim N(\alpha+\beta x_i,\sigma^2), i=1,\ldots,n,$$

and if a particular form of prior distribution is assumed, explicit results are available for the posterior probability distributions of the mean response. Standard deviations of the mean response can be calculated from the posterior distribution. Similarly, for Bayesian logistic regression, which models a binary outcome, a posterior distribution for final scores can be estimated by choosing and appropriate prior for parameters. Whenever the posterior distribution becomes too complex and intractable, scientists have used simplification techniques like Markov Chain Monte Carlo sampling, variational inference based approximation, etc., to arrive at a simpler approximate of the posterior distribution of the predictions. Standard deviations can be then calculated from these posterior distributions. In deep learning algorithms like Neural Networks, dropout methodology has been used as a Bayesian approximation to represent model uncertainty. In use cases involving deep neural networks, theoretical framework have been developed that use dropout training in deep neural networks (NNs) as approximate Bayesian inference in deep gaussian processes. A direct result of this theory gives tools to model uncertainty with dropout NNs. Such an approach mitigates the problem of representing uncertainty in deep learning without sacrificing either computational complexity or test accuracy.

However, the above-described techniques are not applicable on non-parametric techniques such as boosting-based tree algorithms like gradient boosting machine (GBM) and extreme gradient boosting (XG-Boost) techniques. Since these techniques, in general, outperform Logistic Regression and Neural Networks for classification techniques with structured data, it may be desirable to estimate confidence scores for the scores predicted using such techniques to reflect the uncertainties in the predictions. As a naïve approach, one can generate bootstrap samples and train a model on each samples and compute variance empirically. However, such an approach consumes a considerable amount of computation power and adds cost for both model training and model scoring during production. In certain contexts (e.g., given latency constraints, computation constraints, etc.) it may be infeasible to execute a large number of bootstrapped models in real time. Accordingly, various embodiments described below are effective to generate confidence scores to estimate uncertainty in scores generated by boosting-based tree machine learning models.

Figure 1:
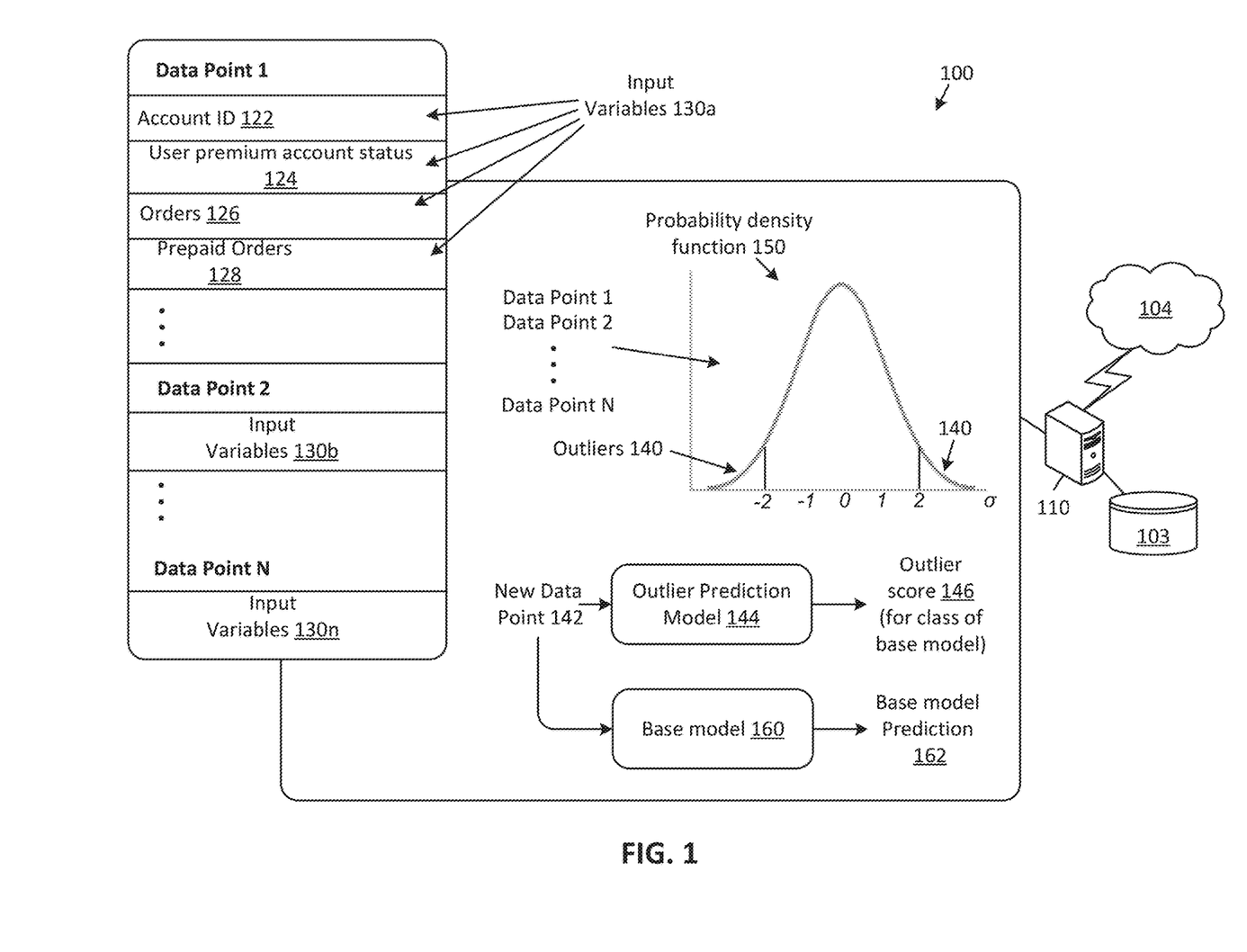
FIG. 1 is a diagram of a system configured to generate an outlier prediction model to generate confidence scores for boosting-based tree machine learning models, according to various embodiments of the present disclosure.

FIG. 1 is a diagram of a system 100 configured to generate an outlier prediction model 144 to generate confidence scores for boosting-based tree machine learning models, according to various embodiments of the present disclosure. In various examples, at least one computing device 110 may be configured in communication with a non-transitory computer-readable memory 103. In various examples, the non-transitory computer-readable memory 103 may store various instructions that may be effective to program at least one processor of the computing device 110 to perform the various techniques described herein. In at least some examples, computing device 110 may communicate with one or more other computing devices over network 104 (e.g., a wide area network—such as the internet—and/or a local area network) to perform the various techniques described herein.

System 100 may comprise a base model 160. As used herein, "base model" may refer to a machine learning model that is configured to output one or more predictions (e.g., base model scores), such as base model prediction 162. For example, the base model prediction 162 may be a score indicating that a particular e-commerce account should be suspended, that a payment-on-demand option for an account should be suspended, etc. The base model 160 may be effective to generate base model scores/predictions for data points that may represent records, transactions, accounts, etc. Each data point (including Data Points 1, 2, . . . , N and new data point 142) may be associated with a plurality of input variables describing characteristics of the various respective data points. For example, data point 1 may comprise account ID 122 (e.g., an account identification number), user premium account status 124 (e.g., indicating an account's premium and/or non-premium status), orders 126 (e.g., indicating past orders associated with the Account ID 122), prepaid orders 128 (e.g., indicating past orders associated with account ID 122 that were prepaid), etc. The various data associated with data point 1 (e.g., account ID 122, user premium account status 124, orders 126, prepaid orders 128, etc.) may be described as input variables 130*a* of data point 1. Similarly, each data point may be associated with a set of input variables. For example, data point 2 is associated with input variables 130*b*, data point 3 (not shown) may be associated with input variables 130*c* (not shown in FIG. 1), and data point N may be associated with input variables 130*n*.

Base model 160 may be effective to generate prediction scores (e.g., including base model prediction 162) for various different classes (e.g., class scores). For example, a base model 160 may predict whether or not a particular data point is associated with the class account suspended indicating that the account associated with the data point should be suspended. In an example embodiment, data points (e.g., data points 1, 2, . . . , N) associated with a class that base model 160 is attempting to predict may be aggregated and used to train an outlier prediction model 144. Outlier prediction model 144 may fit a probability density function 150 to the data points 1, 2, . . . , N belonging to the relevant class. Outlier prediction model 144 may use various different outlier prediction algorithms to predict whether or not a particular input data point is an outlier (e.g., is $\geq |2\sigma|$ from a mean value of data points 1, 2, . . . , N) 140. Although the probability density function 150 is depicted as a normal distribution, the actual function may depend on the data points 1, 2, . . . , N to which the function is fit.

After training, outlier prediction model 144 may receive new data point 142 (e.g., including input variables associated with new data point 142 and/or feature data representations thereof) as input and may generate an outlier score 146 for a particular class of the base model 160. The outlier score 146 may represent a probability that the new data point 142 is an outlier for the particular class. In various other embodiments, the outlier prediction model 144 may also receive a base model prediction 162 representing a base model score for the new data point 142 and may generate outlier score 146 based further on the base model prediction 162 to determine whether the base model prediction 162 for the new data point 142 is an outlier 140 with respect to the selected base model class.

In various examples, if the new data point 142 is determined to be an outlier 140 (e.g., based on outlier score 146), a determination may be made that there is low confidence in the base model prediction 162. Accordingly, the low confidence in the base model prediction 162 may affect the processing of the new data point 142. For example, new data point 142 may be a first record representing a request to enter into a payment on delivery transaction. The base model prediction 162 may indicate that payment on delivery should be suspended for the account ID associated with the new data point 142. However, outlier prediction model 144 may generate an outlier score 146 for the new data point 142 (and/or for the base model prediction 162 for the new data point 142) indicating a low confidence in the base model prediction 162. In some examples, the outlier score 146 (and/or other confidence scores generated by the various models described herein) may be compared to a threshold confidence score to determine whether or not an action associated with the base model prediction 162 is to be ignored. For example, although the base model prediction 162 for new data point 142 may indicate that the payment on delivery option for the account ID of new data point 142 should be suspended, the fact that the outlier prediction model 144 has determined that the base model score is an outlier 140 may indicate that the payment on delivery option should not be suspended, as there is low confidence in the base model prediction score (e.g., base model prediction 162).

Various algorithms may be used for outlier prediction model 144. For example, an isolation forest algorithm may be used. In isolation forest, data partitioning is done using a set of trees. Isolation forest provides an anomaly score looking at how isolated a point is in the structure. The anomaly score is then used to identify outliers 140 from normal observations. Isolation forest typically performs well on multi-dimensional data.

In another example, histogram-based outlier detection algorithms may be used. Histogram-based outlier detection is an efficient unsupervised method that assumes the feature independence and calculates the outlier score 140 by building histograms. Histogram-based outlier detection is faster than multivariate approaches, but may be associated with less precision.

In another example, feature bagging (e.g., a feature bagging algorithm) may be used for outlier prediction model 144. A feature bagging detector fits a number of base detectors on various sub-samples of the dataset. It uses averaging or other combination methods to improve the prediction accuracy. By default, Local Outlier Factor (LOF) may be used as the base estimator. However, any estimator could be used as the base estimator, such as k-Nearest Neighbors (kNN) and/or angle-based outlier detection (ABOD). Feature bagging first constructs n sub-samples by randomly selecting a subset of features. This brings out the diversity of base estimators. Finally, the prediction score is generated by averaging or taking the maximum of all base detectors.

In another example, clustering-based local outlier factors (e.g., a clustering-based local outlier factor algorithm) may be used for outlier prediction model 144. Clustering-based local outlier factor classifies the data into small clusters and large clusters. The anomaly score is then calculated based on the size of the cluster the point belongs to, as well as the distance to the nearest large cluster.

In another example, a kNN detector may be used for outlier prediction model 144. In kNN, for any data point, the distance to its kth nearest neighbor may be viewed as the outlying score. In an example embodiment, there are three kNN detectors: a) "Largest," which uses the distance of the kth neighbor as the outlier score, b) "Mean," which uses the average of all k neighbors as the outlier score, and c) "Median," which uses the median of the distance to k neighbors as the outlier score. The outlier detection techniques for each class of base model 160 may be leveraged to identify whether a point is an outlier with respect to that class or not.

As described in further detail below, a number of offline bootstrapped machine learning models may be used to estimate score variation of the base model 160. The variations in scores generated by the bootstrapped machine learning models may be used to estimate the variability of the base model 160's predictions. Accordingly, the variability (e.g., in terms of standard deviation and/or variance) may be used to generate a training data set (with the standard deviation/variance being a target label) that can be used to train a confidence score prediction model. Thereafter, during production/runtime the bootstrapped machine learning models need not be executed or maintained. During production the base model 160 may be used to predict scores for a relevant class, while the confidence score prediction model may be used to generate a confidence score for the base model 160's prediction, as described in additional detail below. Accordingly, the confidence score may be used to evaluate the confidence in the base model 160's prediction and may thus be accounted for when determining whether or not to take some action based on the base model 160's prediction.

For example, the base model 160 may be predicting whether or not an individual's account is likely fraudulent and should thus be suspended. If the base model 160 outputs a prediction score that indicates that an individual's account should be suspended, but the confidence score prediction model indicates a very low confidence in the base model 160's prediction, the suspension of the individual's account may be held in abeyance pending further investigation.

Figure 2:
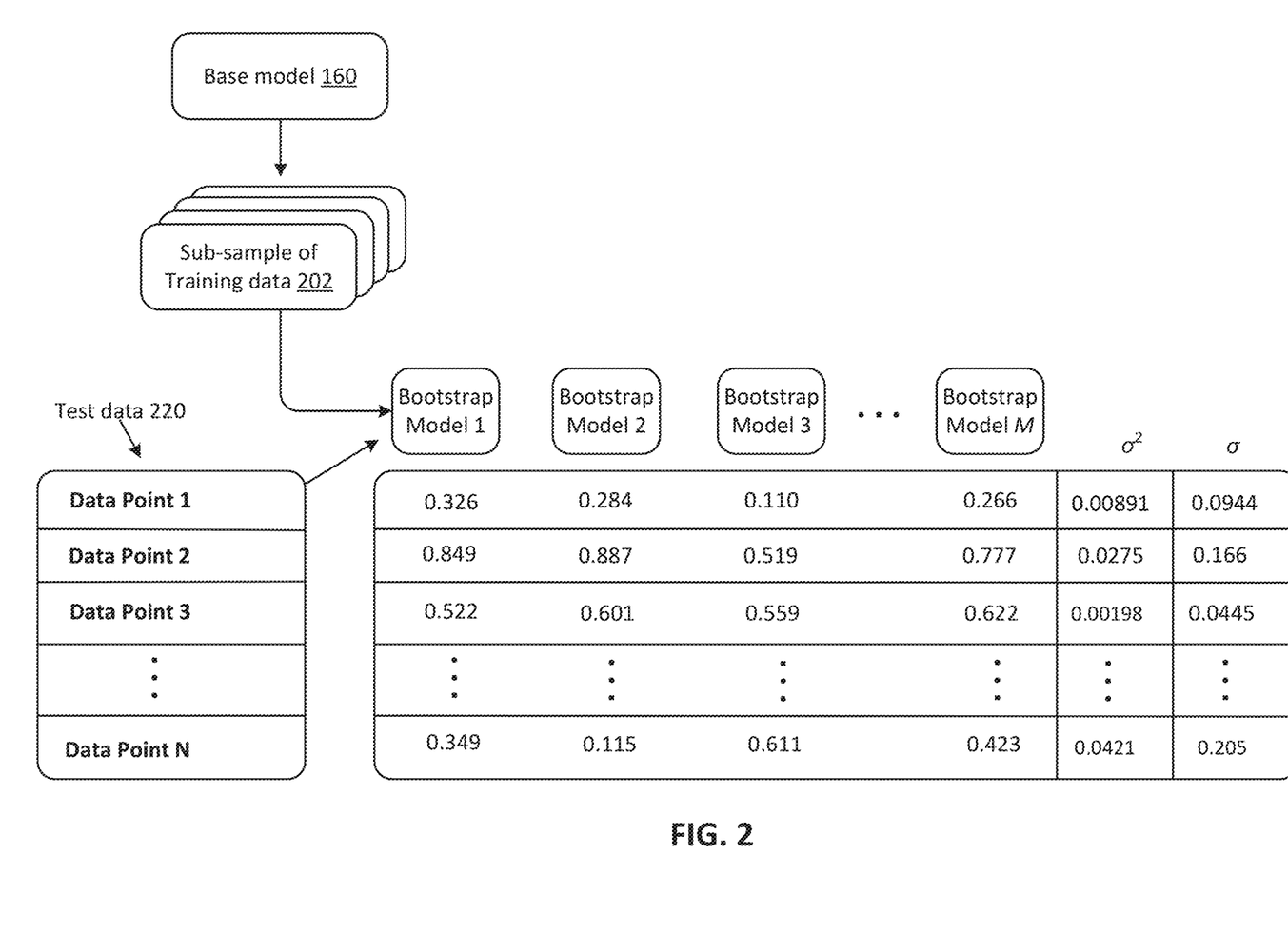
FIG. 2 depicts generation of multiple bootstrapped machine learning models that may be used to estimate score variation of a base prediction model, in accordance with various embodiments of the present disclosure.

FIG. 2 depicts generation of multiple bootstrapped machine learning models (e.g., bootstrap model 1, 2, 3, ..., M) that may be used to estimate score variation of a base prediction model (e.g., base model 160), in accordance with various embodiments of the present disclosure. In various examples, bootstrap models 1, 2, 3, ..., M may be generated by randomly and/or pseudo-randomly sub-sampling from the dataset used to train base model 160 M times, with replacement, to generate M training sets (e.g., comprising the sub-samples of training data 202). The bootstrap models 1, 2, 3, ..., M may be boosting-based tree machine learning models that may use the same algorithm as base model 160.

After training bootstrap models 1, 2, 3, ..., M, test data 220 may be input into the bootstrap models 1, 2, 3, ..., M, to generate M respective prediction output scores (although each model may generate more than one output score depending on the output layer of the model). In the example depicted in FIG. 2, test data 220 comprises data points 1, 2, 3, ..., N. Each of data points 1, 2, 3, ..., N may comprise one or more input variables (e.g., as previously described in reference to FIG. 1). In various examples, the input variables may be used to generate embeddings/input features that may be input to each of the bootstrap models 1, 2, 3, ..., M to generate M outputs. For example, features of data point 1 may be input to each of bootstrap models 1, 2, 3, ..., M to generate M prediction scores for data point 1. Similarly, features of data point 2 may be input to each of bootstrap models 1, 2, 3, ..., M to generate M prediction scores for data point 2, and so on. Thereafter, statistics may be computed for each dataset. For example, variance ($\sigma^2$), mean, and/or standard deviation ($\sigma$) may be computed for each data point of test data 220. As such, the bootstrap models 1, 2, 3, ..., M may be generated in order to compute an estimate of variance/standard deviation for base model 160 on out-of-sample data.

As described in further detail below, the standard deviation and/or variance determined using the bootstrap models 1, 2, 3, ..., M may be used as target labels for training data used to train a confidence score prediction machine learning model to predict standard deviation/variance for a particular input to the base model 160 and/or for a particular output score of base model 160. Notably, use of the bootstrap models 1, 2, 3, ..., M in order to estimate variance and/or standard deviation and training a single confidence score prediction model using the estimated variance and/or standard deviation as a target label avoids the need to execute and/or maintain a large number of bootstrap models during runtime/production. As described in further detail below, the bootstrap models 1, 2, 3, ..., M need not be executed during runtime/production.

Training the confidence score prediction machine learning models may include determining a difference between a predicted standard deviation and a target standard deviation of the training data (e.g., an error), and updating parameters of the confidence score prediction model to minimize the error.

Figure 3:
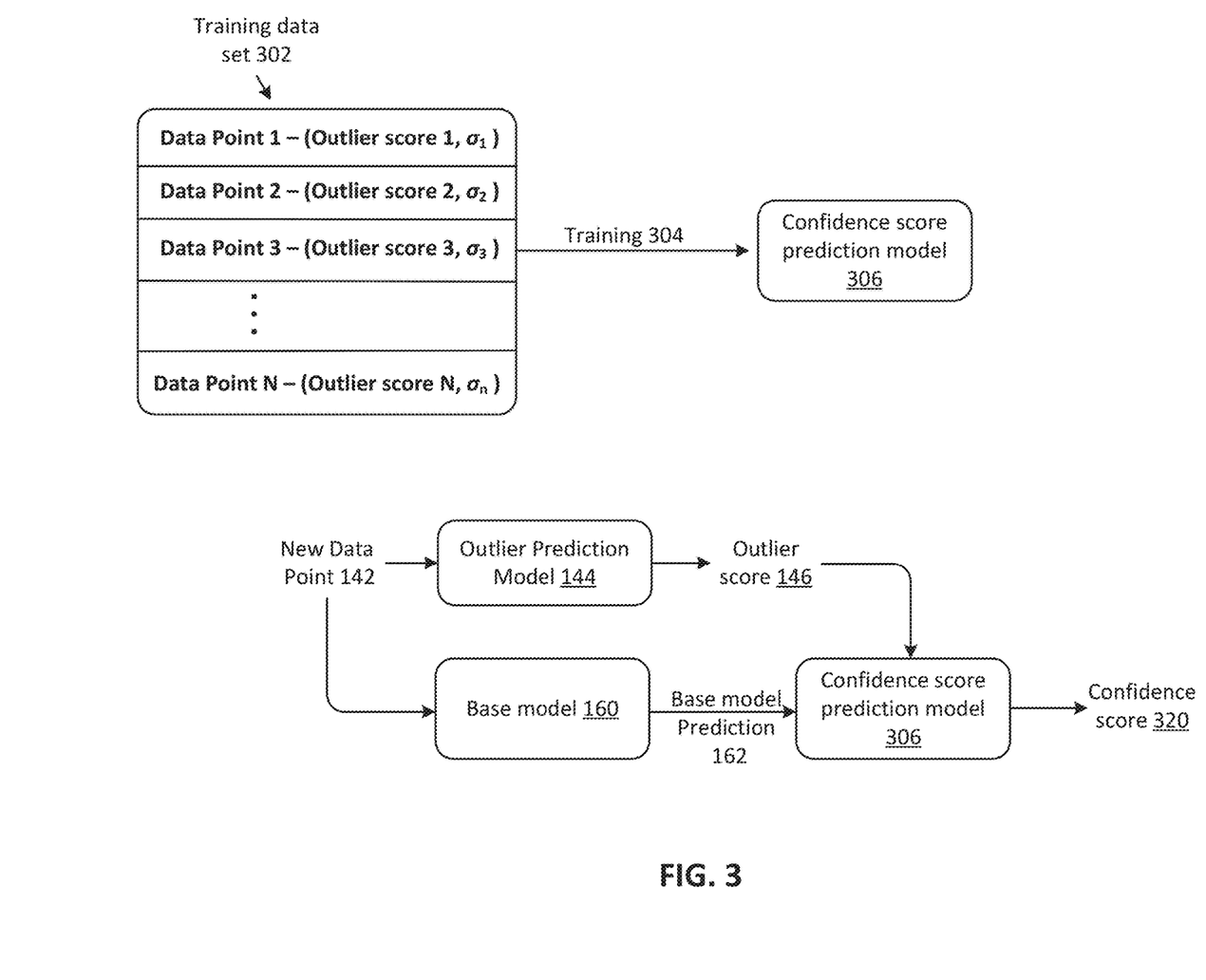
FIG. 3 depicts a confidence score prediction model that may use outlier scores to predict confidence scores for outputs of a base prediction model, in accordance with various aspects of the present disclosure.

FIG. 3 depicts a confidence score prediction model 306 that may use outlier scores 146 to predict confidence scores for outputs of a base model 160, in accordance with various aspects of the present disclosure.

As described above, bootstrap models 1, 2, 3, ..., M (FIG. 2) may be used to generate statistics for each data point of test data 220. Thereafter, the statistics (e.g., standard deviation) may be used as a target label for a training dataset 302. Accordingly, as shown in FIG. 3, the outlier score for each data point may be paired with a target label (e.g., standard deviation) to generate training dataset 302. The outlier scores 1, 2, ..., N may be generated using outlier prediction model 144 (the outlier prediction machine learning model described above in reference to FIG. 1). Although not depicted in FIG. 3, in various examples, the data points of training dataset 302 may further include input variables describing the various characteristics of each data point. Additionally, in some further examples, the data points of training dataset 302 may include base model predictions 162 output by base model 160.

The training dataset 302 may be used to train confidence score prediction model 306. The confidence score prediction model 306 may generate a predicted confidence score 320 representing a confidence in the base model prediction 162 for the relevant data point (e.g., for the relevant transaction record, etc.). In some examples, the confidence score 320 may be the predicted standard deviation for the current data point.

In an example, after training 304, a new data point 142 may be received (e.g., a data point representing a first record including one or more input variables, such as account ID, past transaction history, payment on delivery data, etc. The new data point 142 (and/or a feature representation thereof) may be input into base model 160 to generate a base model prediction 162. In an example, the base model prediction 162 may be a score related to whether or not the account ID should be suspended or not (on the basis of a transaction history associated with the new data point 142). Additionally, the new data point 142 (and/or a feature representation thereof) may be input into outlier prediction model 144. Outlier prediction model 144 may generate outlier score 146, representing a determination as to whether the new data point 142 is an outlier with respect to a probability distribution modeled by outlier prediction model 144 (e.g., probability density function 150 of FIG. 1).

The outlier score 146 for new data point 142 may be input into confidence score prediction model 306. In some examples, the base model prediction 162 may also be input into confidence score prediction model 306 along with the outlier score 146, while in other embodiments the confidence score prediction model 306 may be trained to generate confidence score 320 using outlier score 146 without the base model prediction 162. As previously described, the confidence score prediction model 306 may generate confidence score 320 representing a confidence in the base model prediction 162. The confidence score 320 may be used to process the new data point 142 by assessing the confidence or uncertainty in the base model prediction 162.

For example, the base model prediction 162 may be a score that is used to determine whether or not to suspend a user account, as previously described. In various embodiments, the base model prediction 162 may be compared to a threshold value for account suspension. If the base model prediction 162 exceeds the threshold value, the confidence score in the base model prediction 162 may be checked to ensure that there is a high enough confidence in the base model prediction 162 prior to taking an action (e.g., prior to suspending the user account). Accordingly, after determining that the base model prediction 162 exceeds the threshold value, the confidence score 320 may be compared to a confidence score threshold. If the confidence score 320 exceeds the confidence score threshold, the action may be taken (e.g., the user account may be suspended), as there is high confidence in the base model prediction 162.

Advantageously, after training outlier prediction model 144, base model 160, and confidence score prediction model 306, as described above, confidence score 320 (and confidence score intervals, generally) may be predicted during runtime at low latency. Notably, a plurality of bootstrapped models are not needed during runtime in order to generate confidence scores for base model prediction 162. In some previous approaches a multitude of bootstrapped models may be used to estimate a confidence score for predictions of the base model 160. However, use of many bootstrapped models (e.g., tens and/or hundreds of bootstrapped models) incurs high latency (if executed serially) and high compute overhead. If a large number of bootstrapped models are run in parallel to control latency, the compute overhead may be prohibitively expensive. Conversely, using the approaches described above in reference to FIG. 3, only three models are run during prediction. The three models may achieve highly scalable, low latency performance for generating confidence scores for boosting-based tree machine learning models during run time. In various examples, the techniques described above may generate confidence score 320 and base model prediction 162 within ≤100 milliseconds.

Figure 4:
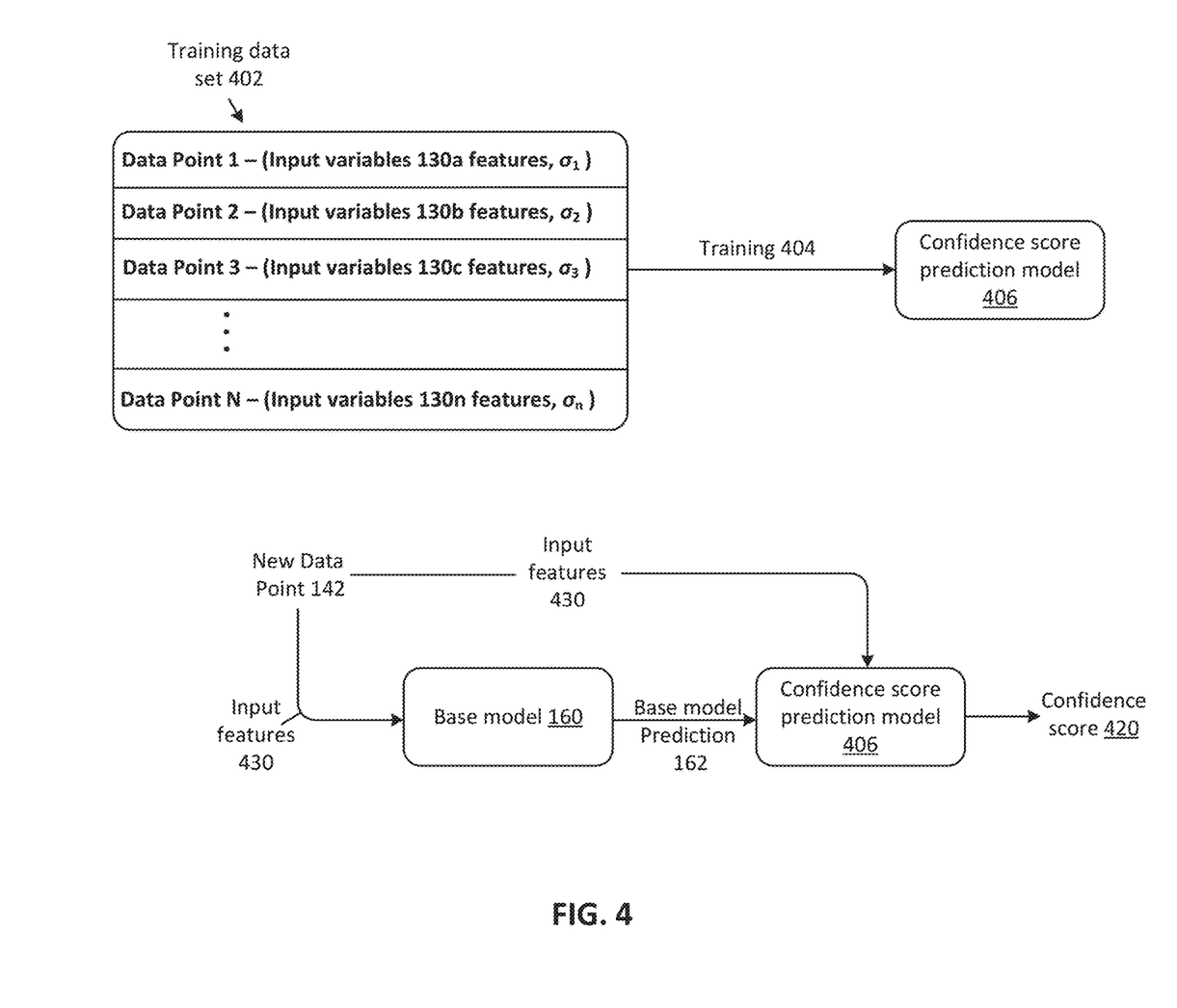
FIG. 4 depicts a confidence score prediction model that may use input features of a base prediction model to generate confidence score predictions for outputs of a base prediction model, in accordance with various aspects of the present disclosure.

FIG. 4 depicts a confidence score prediction model 406 that may use input features of base model 160 to generate confidence scores 420 for outputs of base model 160, in accordance with various aspects of the present disclosure.

As described above, bootstrap models 1, 2, 3, ..., M (FIG. 2) may be used to generate statistics for each data point of test data 220. Thereafter, the statistics (e.g., standard deviation) may be used as a target label for a training dataset 402. Accordingly, as shown in FIG. 4, the input variable features (e.g., features representing the input variables 130a, 130b, 130c, ..., 130n) for each data point may be paired with a target label (e.g., standard deviation) to generate training dataset 402. The input variables features in the training dataset 402 may be the same input features 430 that are used as input to the base model 160 for determining base model prediction 162. Although not depicted in FIG. 4, in various examples, the data points of training dataset 402 may include base model predictions 162 output by base model 160.

The training dataset 402 may be used to train confidence score prediction model 406 (e.g., during training 404). The confidence score prediction model 406 may generate a confidence score prediction 420 representing a confidence in the base model prediction 162 for the relevant data point (e.g., for the relevant transaction record, etc.). In some examples, the confidence score 420 may be the predicted standard deviation for the current data point.

In an example, after training 404, a new data point 142 may be received (e.g., a data point representing a first record including one or more input variables, such as account ID, past transaction history, payment on delivery data, etc. The new data point 142 (and/or a feature representation thereof) may be input as input features 430 into base model 160 to generate a base model prediction 162. In an example, the base model prediction 162 may be a score related to whether or not a PoD option should be suspended or not for the relevant account (on the basis of a history of PoD for the account associated with the new data point 142).

Additionally, the input features 430 may be input into confidence score prediction model 406. In some examples, the base model prediction 162 may also be input into confidence score prediction model 406 along with the input features 430, while in other embodiments the confidence score prediction model 406 may be trained to generate confidence score 420 using input features 430 without the base model prediction 162. As previously described, the confidence score prediction model 406 may generate confidence score 420 representing a confidence in the base model prediction 162. The confidence score 420 may be used to process the new data point 142 by assessing the confidence or uncertainty in the base model prediction 162.

For example, the base model prediction 162 may be a score that is used to determine whether or not to suspend a PoD option, as previously described. In various embodiments, the base model prediction 162 may be compared to a threshold value for suspension of the PoD option. If the base model prediction 162 exceeds the threshold value (or otherwise compares to the threshold in such a way as to indicate PoD suspension), the confidence score in the base model prediction 162 may be checked to ensure that there is a high enough confidence in the base model prediction 162 prior to taking an action (e.g., prior to suspending the PoD option). Accordingly, after determining that the base model prediction 162 exceeds the threshold value, the confidence score 420 may be compared to a confidence score threshold. If the confidence score 420 exceeds the confidence score threshold, the action may be taken (e.g., the PoD option for the user account may be suspended), as there is high confidence in the base model prediction 162.

Advantageously, after training base model 160 and confidence score prediction model 406, as described above, confidence score 420 (and confidence score intervals, generally) may be predicted during runtime at low latency. Notably, a plurality of bootstrapped models are not needed during runtime in order to generate confidence scores for base model prediction 162. In some previous approaches a multitude of bootstrapped models may be used to estimate a confidence score for predictions of the base model 160. However, use of many bootstrapped models (e.g., tens and/or hundreds of bootstrapped models) incurs high latency. For example, each bootstrapped model may take between 20 and 30 milliseconds to generate a score. If executed serially, the use of several models incurs a large amount of latency. If run in parallel, running and maintaining a large number of bootstrapped models incurs a large amount of compute overhead. Conversely, using the approaches described above in reference to FIG. 4, only two models are run during prediction. The two models may achieve highly scalable, low latency performance for generating confidence scores for boosting-based tree machine learning models during run time. In various examples, the techniques described above may generate confidence score 420 and base model prediction 162 within ≤100 milliseconds.

Figure 5:
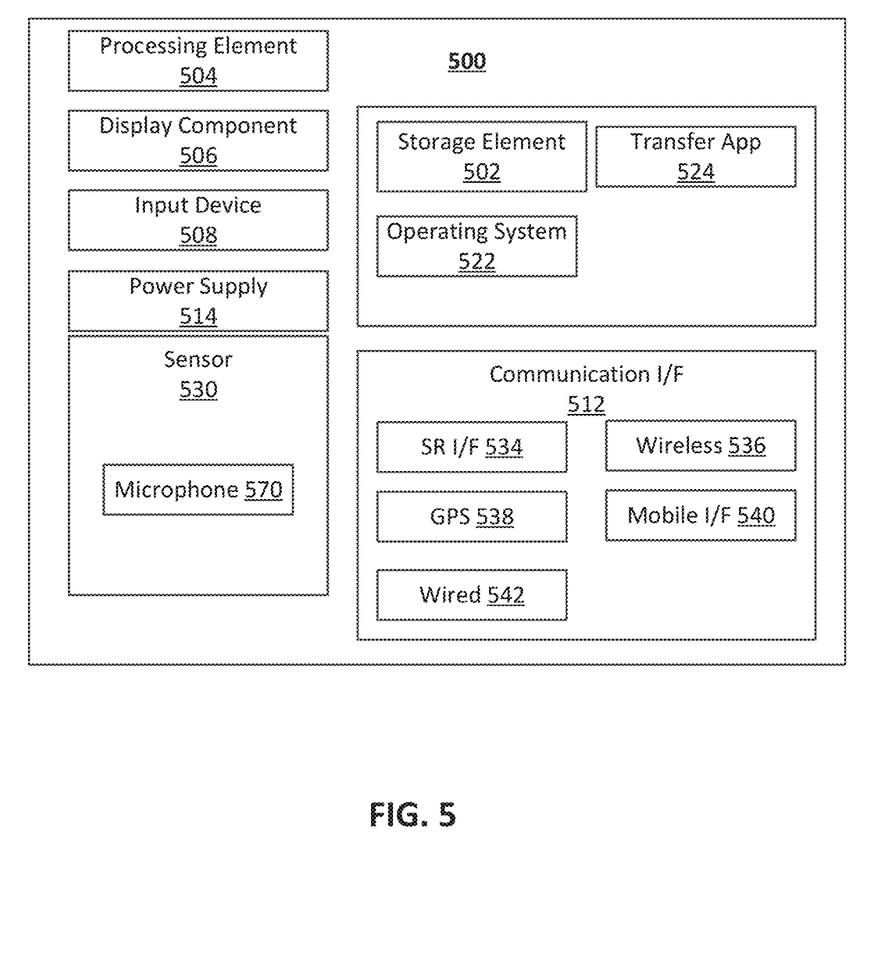
FIG. 5 is a block diagram showing an example architecture of a computing device that may be used to generate confidence scores for boosting-based tree machine learning models, in accordance with various embodiments described herein.

FIG. 5 is a block diagram showing an example architecture 500 of a computing device that may be configured to generate confidence scores for boosting-based tree machine learning models, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models, parameters thereof, and/or data representations of the base dataset described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone 570 included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests and/or natural language inputs.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components. The components of the system, as described herein, are exemplary, and may be located as a stand-alone device or may be included, in whole or in part, as a component of a larger device or system.

Figure 6:
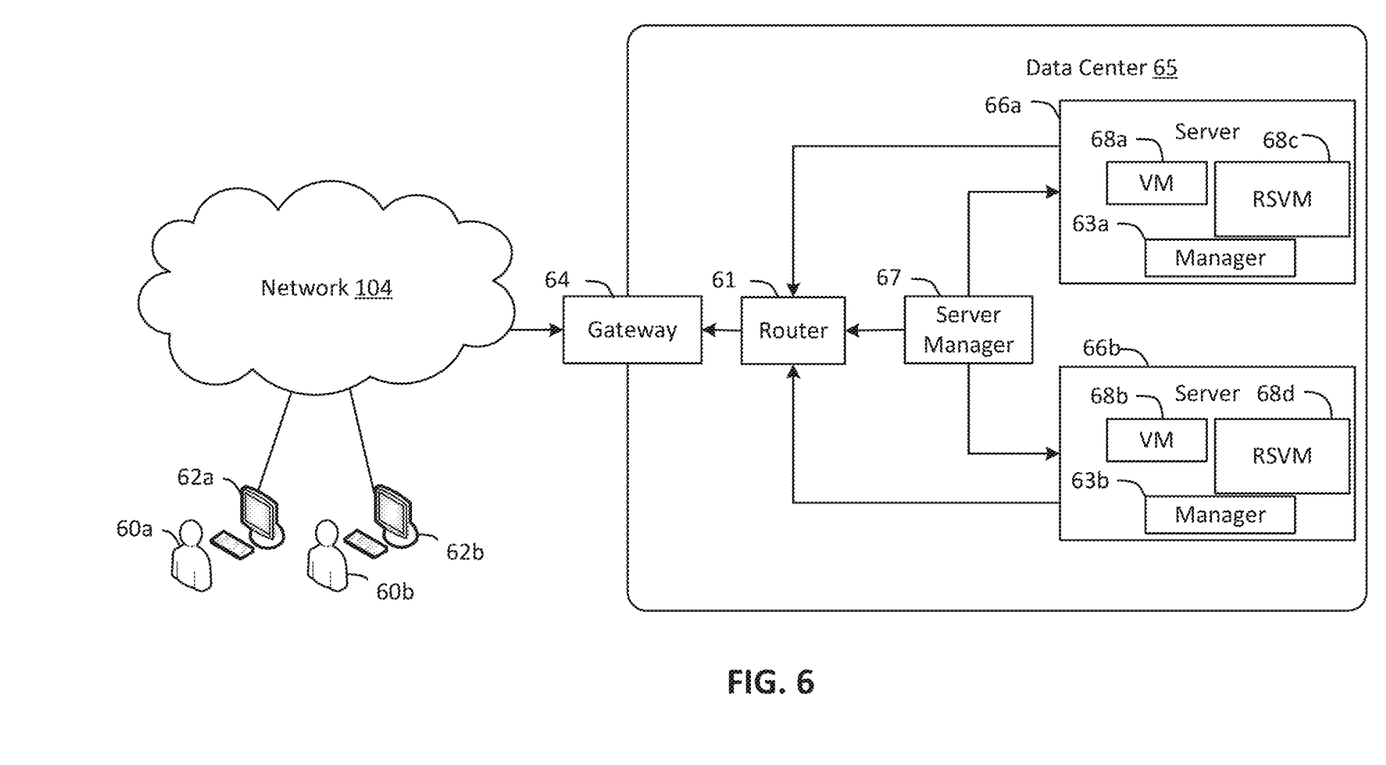
FIG. 6 is a diagram illustrating an example system for sending and providing data that may be used in accordance with the present disclosure.

An example system for sending and providing data that may be used to generate confidence scores for boosting-based tree machine learning models will now be described in detail. In particular, FIG. 6 illustrates an example computing environment in which the embodiments described herein may be implemented. For example, the computing environment of FIG. 6 may be configured to generate confidence scores for boosting-based tree machine learning models as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various confidence score generation techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
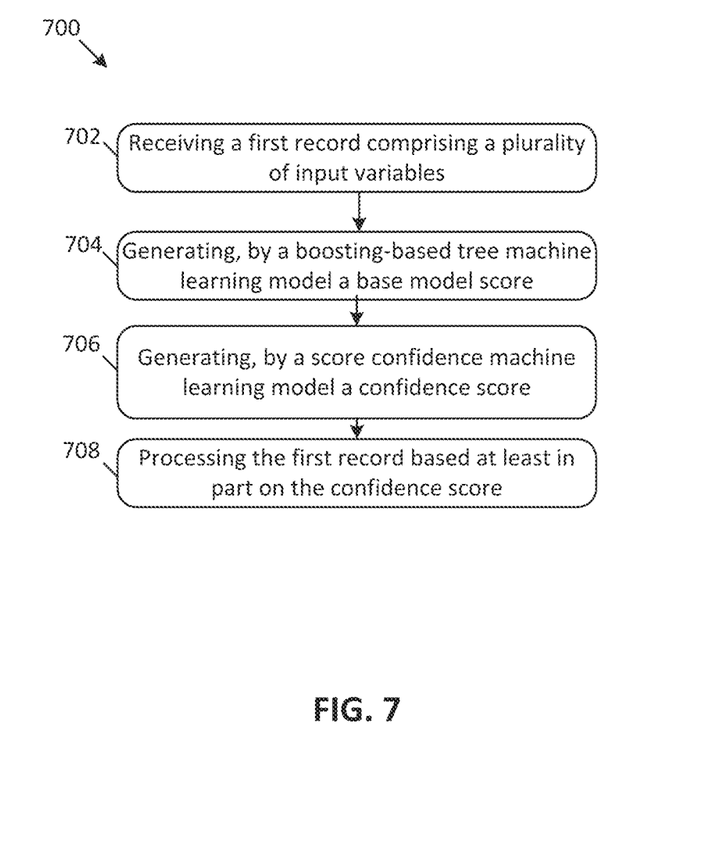
FIG. 7 depicts an example process that may be used to generate confidence scores for boosting-based tree machine learning models, according to various aspects of the present disclosure.

FIG. 7 depicts an example process 700 that may be used to generate confidence scores for boosting-based tree machine learning models, according to various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 702, at which a first record comprising a plurality of input variables may be received. The first record may be any data point and the input variables may describe various aspects of that data point. For example, the first record may represent a user account and the input variables may represent various data—such as transaction history, premium account status, shipping options, etc., associated with the user account. In another example, the first record may represent a media file and the input variables may represent various data associated with the media file (e.g., release data, title, etc.). In general the first record may be any type of data, according to the desired implementation of the various techniques described herein.

Processing may continue from action 702 to action 704, at which a boosting-based tree machine learning model may generate a base model score. The base model score may be a prediction for the first record. For example, the base model (e.g., a gradient boosting model) may predict whether or not the first record is a member of a first class. For example, the base model may predict whether or not the first record represents a fraudulent transaction, whether or not a user will enjoy a movie or song represented by the first record, etc.

Processing may continue from action 704 to action 706, at which a score confidence machine learning model may generate a confidence score. In various examples, the confidence score may represent a confidence in the output of the boosting-based tree machine learning model generated at action 704. The confidence score may be generated using various different techniques. For example, outlier prediction model 144 may be used to determine a probability that an incoming data point (e.g., the first record) may be an outlier with respect to a probability density function 150. The outlier probability (e.g., outlier score 146) may be used as the confidence score. For example, the outlier probability may be inversely related to the confidence in the prediction of the boosting-based tree machine learning model, with higher outlier probability indicating lower confidence in the boosting-based tree machine learning model output and vice-versa.

Processing may continue from action 706 to action 708, at which the first record may be processed based at least in part on the confidence score. As previously described, the confidence score may be used to ascertain an uncertainty in the prediction of the base model. Accordingly, in various examples, some actions may be taken only when the confidence in the output of the base model is sufficiently high.

In another example, the confidence score may be generated by estimating the variance/standard deviation of the boosting-based tree machine learning model using bootstrapped models trained using out-of-sample data. After estimating the variance/standard deviation, a confidence score prediction model may be trained to predict confidence scores for new data points as described above in reference to FIGS. 2 and 3. In some embodiments, the confidence score prediction model may take outlier scores as input in order to predict confidence scores. In other example embodiments, the confidence score prediction model may take one or more of the input features of the base model (e.g., the boosting-based tree machine learning model) to predict confidence scores.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of generating a confidence score for a boosting-based tree machine learning model score comprising:

generating a plurality of bootstrap models using a dataset of a boosting-based tree machine learning model;

determining, for first media data comprising a first plurality of attributes, a plurality of output scores comprising a respective output score for each of the plurality of bootstrap models;

determining, for the first media data, a first standard deviation of the plurality of output scores;

training a confidence score prediction machine learning model to generate confidence scores using a training instance comprising the first standard deviation as a target label;

receiving second media data comprising a second plurality of attributes;

determining, by the boosting-based tree machine learning model for the second media data, a first class score, wherein the first class score indicates a prediction related to the second media data;

determining, by an outlier prediction machine learning model, an outlier prediction score for the second media data using the second plurality of attributes;

inputting the outlier prediction score and the first class score into the confidence score prediction machine learning model trained using the training instance;
generating, by the confidence score prediction machine learning model, a confidence score indicating a confidence in the first class score determined by the boosting-based tree machine learning model for the second media data;
selecting the second media data as recommended media data based on the confidence score being above a confidence score threshold; and
generating first output data comprising a recommendation of the second media data.

2. The method of claim 1, further comprising:
training the confidence score prediction machine learning model based at least in part on:
generating, by the confidence score prediction machine learning model, a predicted standard deviation for a second class score determined by the boosting-based tree machine learning model for the first media data;
determining an error representing a difference between the predicted standard deviation and the target label; and
updating parameters of the confidence score prediction machine learning model to minimize the error.

3. A method comprising:
receiving a first record comprising a plurality of input variables representing characteristics of the first record;
generating, by a boosting-based tree machine learning model for the first record, a base model score, wherein the base model score is generated based on the plurality of input variables and wherein the base model score represents a likelihood that the first record is associated with a first class;
generating a plurality of bootstrap models by subsampling a dataset of the boosting-based tree machine learning model;
determining, for a second record, a plurality of output scores comprising a respective output score from each of the plurality of bootstrap models;
determining, for the second record, a standard deviation of the respective output scores from each of the plurality of bootstrap models;
training a score confidence machine learning model to generate confidence scores in predictions by the boosting-based tree machine learning model based at least in part on using the standard deviation as a target label of at least one training instance;
generating, by the score confidence machine learning model for the first record, a confidence score indicating a confidence in the base model score;
determining a first action to take for the first record based at least in part on the first class;
determining, based at least in part on the confidence score, that the first action should be taken; and
executing, by at least one computing device, the first action based at least in part on the confidence score.

4. The method of claim 3, further comprising training an outlier prediction model using a plurality of records belonging to the first class, wherein the outlier prediction model is trained to predict an outlier score comprising a probability that a given record is an outlier with respect to a dataset comprising the plurality of records belonging to the first class.

5. The method of claim 3, further comprising:
comparing the base model score to a first threshold associated with the first class;
determining that the base model score indicates that the first record is associated with the first class based at least in part on the first threshold;
determining the first action associated with the first class;
comparing the confidence score to a confidence score threshold; and
executing the first action for the first record based at least in part on the comparing of the confidence score to the confidence score threshold.

6. The method of claim 3, further comprising:
updating parameters of the score confidence machine learning model using the standard deviation of the plurality of output scores.

7. The method of claim 3, further comprising:
generating feature data representing the plurality of input variables;
generating the base model score based at least in part on inputting the feature data into the boosting-based tree machine learning model for the first record; and
generating the confidence score based at least in part on inputting the feature data into the score confidence machine learning model.

8. The method of claim 3, further comprising:
generating, by an outlier prediction model, an outlier score indicating a probability that the first record represents an outlier with respect to a dataset; and
generating the confidence score based at least in part on inputting the outlier score into the score confidence machine learning model.

9. The method of claim 3, wherein the score confidence machine learning model is trained using at least one of a histogram-based outlier detection algorithm, a clustering-based local outlier factor algorithm, and an isolation forest algorithm.

10. The method of claim 4, further comprising:
comparing the confidence score to a confidence score threshold associated with the first action; and
determining that the first action should be taken based at least in part on the confidence score threshold associated with the first action.

11. A system comprising:
at least one processor; and
at least one non-transitory computer-readable memory storing instructions that, when executed by the at least one processor, are effective to program the at least one processor to:
receive a first record comprising a plurality of input variables representing characteristics of the first record;
generate, by a boosting-based tree machine learning model for the first record, a base model score, wherein the base model score is generated based on the plurality of input variables and wherein the base model score represents a likelihood that the first record is associated with a first class;
generate a plurality of bootstrap models by subsampling a dataset of the boosting-based tree machine learning model;
determine, for a second record, a plurality of output scores comprising a respective output score from each of the plurality of bootstrap models;
determine, for the second record, a standard deviation of the respective output scores from each of the plurality of bootstrap models;
train a score confidence machine learning model to generate confidence scores in predictions by the boosting-based tree machine learning model based at least in part on using the standard deviation as a target label of at least one training instance;

generate, by the score confidence machine learning model for the first record, a confidence score indicating a confidence in the base model score;

determine a first action to take for the first record based at least in part on the first class;

determine, based at least in part on the confidence score, that the first action should be taken; and execute, by at least one computing device, the first action based at least in part on the confidence score.

12. The system of claim 11, the at least one non-transitory computer-readable memory storing further instructions that, when executed by the at least one processor, are further effective to program the at least one processor to:

train an outlier prediction model using a plurality of records belonging to the first class, wherein the outlier prediction model is trained to predict an outlier score comprising a probability that a given record is an outlier with respect to a dataset comprising the plurality of records belonging to the first class.

13. The system of claim 11, the at least one non-transitory computer-readable memory storing further instructions that, when executed by the at least one processor, are further effective to program the at least one processor to:

compare the base model score to a first threshold associated with the first class;

determine that the base model score indicates that the first record is associated with the first class based at least in part on the first threshold;

determine an action associated with the first class;

compare the confidence score to a confidence score threshold; and executing the first action for the first record based at least in part on comparison of the confidence score to the confidence score threshold.

14. The system of claim 11, the at least one non-transitory computer-readable memory storing further instructions that, when executed by the at least one processor, are further effective to program the at least one processor to:

update parameters of the score confidence machine learning model using the standard deviation of the plurality of output scores.

15. The system of claim 11, the at least one non-transitory computer-readable memory storing further instructions that, when executed by the at least one processor, are further effective to program the at least one processor to:

generate feature data representing the plurality of input variables;

generate the base model score by inputting the feature data into the boosting-based tree machine learning model for the first record; and generate the confidence score based at least in part on inputting the feature data into the score confidence machine learning model.

16. The system of claim 11, the at least one non-transitory computer-readable memory storing further instructions that, when executed by the at least one processor, are further effective to program the at least one processor to:

generate, by an outlier prediction model, an outlier score indicating a probability that the first record represents an outlier with respect to a dataset; and generate the confidence score based at least in part on inputting the outlier score into the score confidence machine learning model.

17. The system of claim 11, the at least one non-transitory computer-readable memory storing further instructions that, when executed by the at least one processor, are further effective to program the at least one processor to:

compare the confidence score to a confidence score threshold associated with the first action; and determine that the first action should be taken based at least in part on the confidence score threshold associated with the first action.

\* \* \* \* \*